Nov. 11, 1952   E. A. STALKER   2,617,487
WING FOR HELICOPTERS AND OTHER AIRCRAFT
Filed Sept. 30, 1948

INVENTOR.
Edward A. Stalker

Patented Nov. 11, 1952

2,617,487

UNITED STATES PATENT OFFICE 2,617,487

WING FOR HELICOPTERS AND OTHER AIRCRAFT

Edward A. Stalker, Bay City, Mich.

Application September 30, 1948, Serial No. 52,001

8 Claims. (Cl. 170—135.4)

My invention relates to wings for helicopters and to variable lift wings for other aircraft.

A helicopter blade is subject to cyclic variation in lift since on the retreating side the lift coefficient must be increased to make up for the reduced relative wind velocity, and on the advancing side the lift coefficient must be decreased. If the wing is cambered it will have a large travel of the C. P. (center of pressure), which will induce torsional vibrations. Because of the difficulties of vibration, contemporary helicopters employ constant C. P. wings with the center of gravity located to coincide chordwise with the C. P. position.

The restriction of the wings to the use of constant C. P. wing sections severely limits the performance of the helicopter in vertical climb and in forward speed.

For vertical climb a higher $L/D$ is needed than is available from a constant C. P. wing. This $L/D$ value can be achieved with a wing of higher lift coefficient than is available from a constant C. P. wing.

As already mentioned, the retreating wing needs a high lift coefficient to sustain it if the advance ratio is to be large, that is the ratio of forward speed to tip speed.

The present invention discloses means to use high lift wing sections in helicopter wings with properly stabilized center of pressures.

Thus an object of this invention is to provide a variable lift wing section having a substantially localized center of pressure.

Another object is to provide a variable lift wing section whose moment variation tends to damp torsional vibration in the wing.

Another object is to provide a wing with a wing section which is adapted to have a high ratio of lift to drag at a high lift coefficient $C_L$.

Still another object is to provide a wing with a wing section whose C. P. is far enough rearward to lie chordwise at substantially the location of the natural center of gravity of the wing structure.

Yet another object is to provide a wing of proper form to employ boundary layer in cooperation with means to provide the proper center of pressure behavior.

Other objects will appear from the description, claims and drawings.

The above objects are accomplished by the means illustrated in the accompanying drawings in which—

Figure 1:
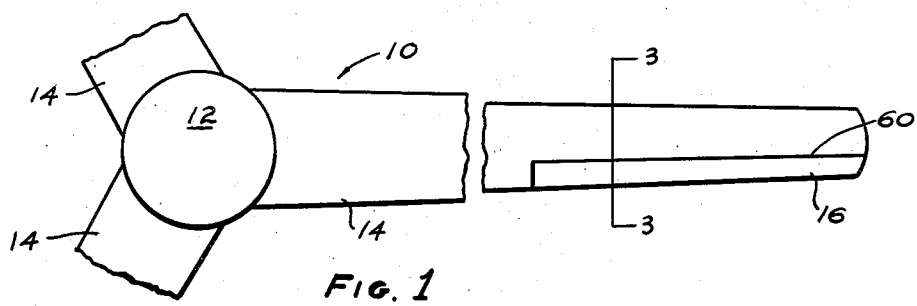
Fig. 1 is a fragmentary plan view of a helicopter rotor.
Figure 2:
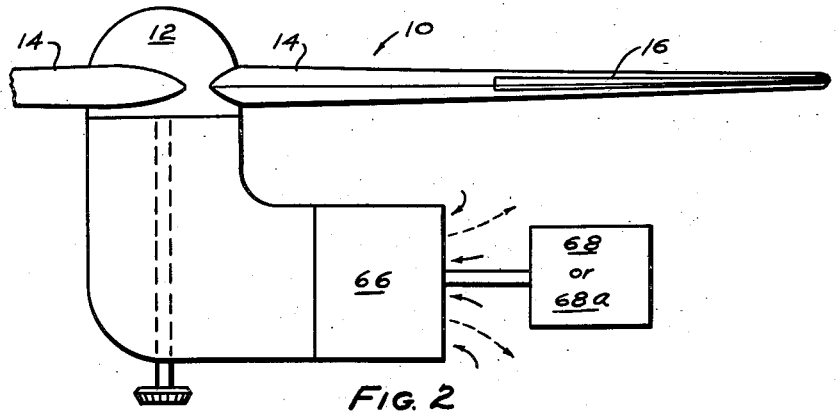
Fig. 2 is a fragmentary elevation of the rotor in Fig. 1.
Figures 3, 4:
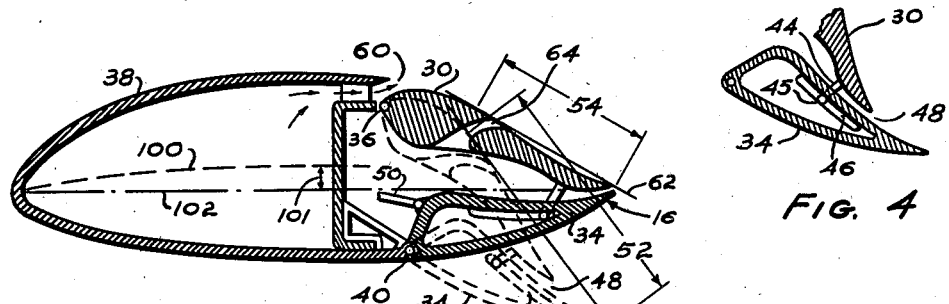
Fig. 3 is a section along the line 3—3 in Fig. 1.
Fig. 4 is a fragment of the flaps to show the T-lug and slot for adjusting the slot width and guiding the end of the flaps.

In Figs. 1 and 2 the helicopter rotor is 10 comprised of the hub 12 and wings 14. The wing section is shown in Fig. 3. This section is devised to provide a C. P. position well forward along the wing chord such as is currently used. This C. P. position is to be substantially retained while the flap unit 16 is lowered from the neutral position substantially in line with the fore body of the wing to its lowered high lift position.

As shown in Fig. 3 the rear flap unit is comprised of an upper flap 30 and a lower flap 34. The upper flap is hinged at 36 to the fore body 38 of the wing. The lower flap 34 is hinged at 40. The trailing edge of the upper flap is constrained to follow the upper contour of the lower flap by means of T-lugs 44 whose heads 45 slide in slots 46 in the lower flap. See Fig. 4. The slot 46 is arranged to widen the flow slot 48 as the upper flap slides forward.

The upper surface of flap 30 has a contour whose forward portion is convex succeeded by a concave portion. This gives a reverse camber to the aft portion of the wing and localizes the C. P. with the flap in neutral.

Normally as a flap is depressed the C. P. moves rearward. In the present invention the C. P. is restrained from a rearward shift by the increasing concavity of the aft portion of the wing as the flaps are depressed.

The downward force from the concavity in the upper surface is augmented by the downward force or suction on the convex under surface of the flap. The combined effect is a function of the concavity in the mean camber line at the aft end of the wing. The greatest change in down force is thus obtained by providing the lower flap with a convex contour and the upper flap with a convex contour which is convertible to a concave contour.

It will be clear from Fig. 3 that as the flap is depressed by force applied through the control rod 50, the trailing edge of covering flap 30 moves forward on the upper surface of flap 34 so that a concavity of width 52 is formed in the upper surface of the wing. This concavity is preferably wider than the width 54 of the concavity in flap 30. It is also deeper as measured below the tangent lines 61 and 62.

The concavity is to be proportioned so that as the flaps are depressed the down load on the flap unit is such that the C. P. stays substantially fixed or moves in such a manner as to stabilize the wing torsionally.

In order to provide for the depression of the upper flap through a large angle to achieve a high $C_L$, a discharge slot is arranged at 60 and another at 64. Compressed air is to be served into the wing interior for flow out the slots 60, 48 and 64 by the compressor 66 driven by prime mover 68.

Figures 5, 6:
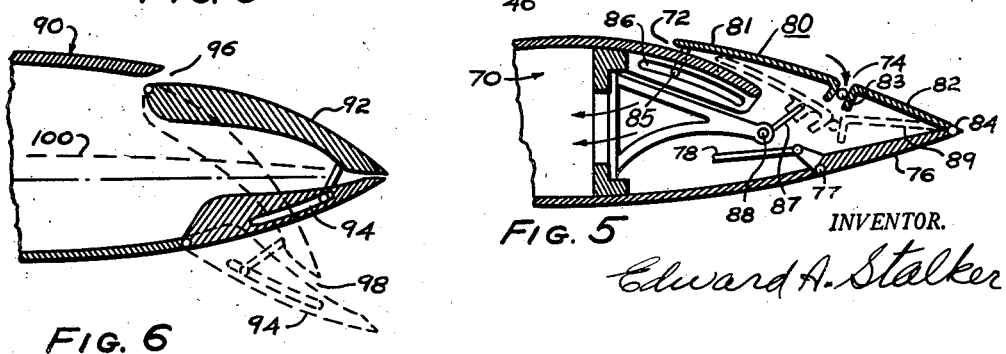
Fig. 5 is another form of the wing employing suction slots.
Fig. 6 is still another form of the wing having initially a convex upper contour over the aft end of the wing.

An alternate wing section 70 is shown in Fig. 5 where the slots 72 and 74 are adapted for suction to be supplied by the compressor 68a adapted to the purpose.

The flap 76 can be depressed about the hinge 77 by the push rod 78. The upper surface flap 80 is comprised of the fore portion 81 joined to the aft portion 82 by the hinge 83. This upper surface or covering flap is hinged at 84 to 76. The fore portion is restrained to slide along the curved upper surface of the wing by a T-lug 85 whose head slides in slot 86.

An inclined link 87 whose lower end slides with the spanwise rod 88 converts the upper surface from convex to concave as indicated by the dotted position 89. This conversion may be effected independently or coincidentally with the lowering of the lower surface 76.

In another variation of the invention, the C. P. is to be located well aft along the wing chord to coincide chordwise with the C. G. which in a flapped wing may occur quite far aft. In this case as shown in Fig. 6 the wing 90 is equipped with a convex upper flap 92 and a concave lower flap 94. The flaps are operated by the same type mechanism as in Fig. 3 and the slots 96 and 98 may be either induction or eduction.

As the flaps are depressed a concavity is formed between the flaps to restrain the C. P. at the desired rearward location. The width and/or depth is given the value to locate the C. P. where desired. This concavity may be smaller than that of Fig. 3.

It is to be noted that the concavity in the upper surface accompanies an increase in the arching of the mean camber line, 100 for instance as evidenced by the increase in height of the mean camber maximum ordinate 101 above the subtending chord 102.

It is desirable to operate the helicopter wing in vertical climb with a large lift coefficient so that it may lift adequately with a slow rate of rotation. Then the power expended in overcoming the profile drag of the wings becomes relatively small and a greater useful load can be lifted per horsepower.

As shown in the earlier application a blade with slots could be operated in vertical climb or hovering at a pitch angle lying between 15° and 50° with an improvement in lifting ability, where the angles are measured with respect to the zero lift line of the wing section at the 0.7 radius and a plane perpendicular to the axis of rotation.

The wings and flaps are to be arranged for large variations in the height of the mean camber maximum ordinate. Values in the range from 0.10c to 0.20c (c=wing chord length) are particularly useful in vertical climb while values of the order of 0.35c are useful for sustaining the retreating wing in high speed flight.

The wings described herein could take advantage of these special conditions while providing for a light weight wing structure.

Cross reference is also made by my application Serial No. 604,864, filed January 12, 1946, wherein an upper surface flap is shown for varying the width of a discharge slot defined between the ends of the upper surfaces of the fore body and upper surface flap. This patent discloses no means of producing a concavity in the aft surface of a wing.

I have disclosed the particular application to a helicopter wing, but the wings are useful in other types of aircraft such as fixed wing machines wherein a balanced and stable wing is desired.

While I have illustrated a specific form of this invention it is to be understood that I do not intend to limit myself to this exact form but intend to claim my invention broadly as indicated by the appended claims.

I claim:

1. In combination in a wing, a wing fore body and a rear flap supported substantially in line in adjustable relation, said flap having an upper surface spaced from the upper aft end of said fore body to provide a substantial gap therebetween, said upper surface being concave, a covering flap extending from the upper rear end of said fore body rearward to upper surface of said rear flap, means supporting said covering flap adjustably on said fore body and on said rear flap in spaced relation to form a slot between adjacent surfaces at each end of said covering flap means to adjust said rear end covering flaps downward to expose said upper surface, to provide concaveness of the upper surface of said wing between the aft end of said covering flap and the trailing edge of said rear flap, and means to induce a flow of fluid through said slots.

2. In combination in a wing, a wing fore body and a rear flap supported substantially in line in adjustable relation, said flap having an upper surface spaced from the upper aft end of said fore body to provide a substantial gap therebetween, said upper surface being concave, a covering flap extending from the upper rear end of said fore body rearward to upper surface of said rear flap, means supporting said covering flap adjustably in said wing in spaced relation to the upper surface of said rear flap to form a slot at the end of said covering flap with the adjacent surface, means to adjust said rear flap downward, means to relatively adjust said covering flap and rear flap downwardly, to expose the concavity of the upper surface of said rear flap between the aft end of said covering flap and the trailing edge of said rear flap, and means to induce a flow of fluid through said slot.

3. In combination, a wing fore body, a lower flap adjustably supported at the aft end of the lower surface of said body, an upper flap adjustably supported at the aft end of the upper surface of said body, said lower flap having a chordwise concave upper surface, means to depress both flaps coincidentally providing for constrained sliding of the aft end of said upper flap forward along said upper surface of said lower flap and in spaced relation thereto to define a spanwise slot, and means to induce a flow of fluid through said slot, said flaps in the depressed positions providing an extent of wing upper surface of chordwise concave contour.

4. In combination in a wing, a wing fore body, a lower flap and an upper flap each adjustably supported at the aft end of said fore body substantially in line chordwise therewith, said upper flap having an exposed surface portion of chordwise convexity succeeded rearward by a surface portion of chordwise concavity, said lower flap having a chordwise concavity in its upper surface of greater depth than said concavity of said upper flap, said upper flap overlying said lower flap concavity and cooperating with said lower flap to provide a sharp trailing edge to said wing, and means to depress said upper and lower flaps downward to move the trailing edge of said upper flap forward along said lower flap to expose said lower flap concavity and thereby tend to localize the center of pressure travel chordwise.

5. In combination in a wing, a wing fore body, a lower flap and an upper flap each adjustably supported at the aft end of said fore body substantially in line chordwise therewith, said upper flap having an exposed surface portion of chordwise convexity succeeded rearward by a surface portion of chordwise concavity, said lower flap having a chordwise concavity in its upper surface of greater depth than said concavity of said upper flap, said upper flap overlying said lower flap concavity and cooperating with said lower flap to provide a sharp trailing edge to said wing, and means to depress said upper and lower flaps downward to move the trailing edge of said upper flap forward along said lower flap to expose said lower flap concavity and thereby tend to localize the center of pressure travel chordwise, said lower flap having a lower chordwise contour different from the upper chordwise contour of said upper flap.

6. In combination in a wing, a wing fore body, a lower flap and an upper flap each adjustably supported at the aft end of said fore body substantially in line chordwise therewith, said upper flap having an exposed surface portion of chordwise convexity succeeded rearward by a surface portion of chordwise concavity, said lower flap having a chordwise concavity in its upper surface of greater chordwise length than said concavity of said upper flap, said upper flap overlying said lower flap concavity and cooperating with said lower flap to provide a sharp trailing edge to said wing, and means to depress said upper and lower flaps downward to move the trailing edge of said upper flap forward along said lower flap to expose said lower flap concavity whereby to tend to localize the center of pressure of travel chordwise.

7. In combination in a wing, a wing fore body, a lower flap and an upper flap each adjustably supported at the aft end of said fore body substantially in line chordwise therewith, said upper flap having an exposed surface portion of chordwise convexity succeeded rearward by a surface portion of chordwise concavity, said concavity being extensive chordwise along approximately one-half of said upper flap, said lower flap having a concavity of greater depth than said concavity of said upper flap, said upper flap overlying said lower flap concavity and cooperating with said lower flap to provide a sharp trailing edge to said wing, and means to depress said upper and lower flaps downward to move the trailing edge of said upper flap forward along said lower flap to expose said lower flap concavity and thereby tend to localize the center of pressure travel chordwise.

8. In combination in a wing, a wing fore body, a lower flap and an upper flap each adjustably supported at the aft end of said body substantially in line chordwise therewith, said lower flap having a chordwise convex lower contour and a chordwise concave upper contour, said upper flap overlying said concave upper contour of said lower flap, and means to depress said flaps simultaneously effecting a forward movement of the trailing edge of said upper flap relative to said lower flap to expose said concave contour, said concave and convex contours of said lower flap cooperating to give a mean camber line of increased concavity at the rear of the wing to provide increased fluid force downward on the aft portion of the wing when said flaps are depressed.

EDWARD A. STALKER.

REFERENCES CITED

The following references are of record in the file of this patent:

UNITED STATES PATENTS

| Number | Name | Date |
|---|---|---|
| 2,045,463 | Hall | June 23, 1936 |
| 2,152,029 | Cone | Mar. 28, 1939 |
| 2,279,615 | Bugatti | Apr. 14, 1942 |
| 2,352,062 | Zap | June 20, 1944 |
| 2,354,042 | Munk | July 18, 1944 |
| 2,406,924 | Stalker | Sept. 3, 1946 |
| 2,506,939 | Plath | May 9, 1950 |